US007380673B2

(12) United States Patent
Fout et al.

(10) Patent No.: US 7,380,673 B2
(45) **Date of Patent: *Jun. 3, 2008**

(54) FLOW DIVERTER AND EXHAUST BLOWER FOR VIBRATING SCREEN SEPARATOR ASSEMBLY

(75) Inventors: Gary Fout, Cypress, TX (US); Roger Suter, Katy, TX (US)

(73) Assignee: M-I L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/992,321

(22) Filed: Nov. 18, 2004

(65) Prior Publication Data

US 2005/0087501 A1 Apr. 28, 2005

Related U.S. Application Data

(60) Continuation of application No. 10/247,089, filed on Sep. 19, 2002, now Pat. No. 6,838,008, which is a division of application No. 09/836,974, filed on Apr. 18, 2001, now Pat. No. 6,485,640.

(51) Int. Cl.
*B07B 1/28* (2006.01)
*B01D 1/24* (2006.01)

(52) U.S. Cl. ...................... 209/309; 209/261; 209/254; 406/157; 210/418

(58) Field of Classification Search ................ 210/188, 210/388, 780; 209/268, 269, 364, 365.1, 209/375, 401, 405, 412, 910, 920, 921, 309, 209/236, 244, 254, 261; 175/66, 206, 207; 406/157, 159–162
See application file for complete search history.

(56) References Cited

U.S. PATENT DOCUMENTS

| | | | | | |
|---|---|---|---|---|---|
| 1,459,846 | A | * | 6/1923 | Mitchell | 209/326 |
| 1,528,083 | A | * | 3/1925 | Schmidt | 417/360 |
| 1,901,370 | A | * | 3/1933 | Kuhner | 55/392.1 |
| 2,015,174 | A | * | 9/1935 | Anglemyer | 96/334 |
| 2,039,573 | A | * | 5/1936 | Weber | 210/389 |
| 2,039,578 | A | | 5/1936 | Blount | |
| 2,120,856 | A | * | 6/1938 | Collison | 4/369 |
| 2,207,576 | A | * | 7/1940 | Brown | 95/71 |
| 2,283,176 | A | * | 5/1942 | Birmann | 60/657 |
| 2,386,299 | A | * | 10/1945 | Downing | 417/154 |
| 3,010,612 | A | * | 11/1961 | Steinle | 222/189.02 |

(Continued)

FOREIGN PATENT DOCUMENTS

WO WO-02/085491 A1 10/2002

OTHER PUBLICATIONS

International Preliminary Examination Report issued in International Application No. PCT/US02/09782; dated Jun. 27, 2003; 10 pages.

(Continued)

*Primary Examiner*—Patrick H. Mackey
*Assistant Examiner*—Mark Hageman
(74) *Attorney, Agent, or Firm*—Osha Liang LLP

(57) ABSTRACT

A flow diverter and a vacuum blower for vibrating screen separator assembly. The flow diverter decelerates and increases the exposed surface of materials. The exhaust blower removes vapors from the materials.

7 Claims, 6 Drawing Sheets

U.S. PATENT DOCUMENTS

| | | | | |
|---|---|---|---|---|
| 3,456,718 | A * | 7/1969 | De Fries | 165/10 |
| 3,572,505 | A * | 3/1971 | Jongbloed | 209/240 |
| 3,640,468 | A * | 2/1972 | Searle et al. | 239/265.29 |
| 3,716,967 | A | 2/1973 | Doyle, Jr. et al. | |
| 3,752,315 | A * | 8/1973 | Hubach | 209/240 |
| 3,807,714 | A * | 4/1974 | Hollyer | 266/134 |
| 3,831,352 | A * | 8/1974 | Parcels | 96/196 |
| 4,153,541 | A * | 5/1979 | Rumpf et al. | 209/143 |
| 4,246,836 | A * | 1/1981 | Smith, Jr. | 99/478 |
| 4,251,183 | A * | 2/1981 | Liu et al. | 415/198.1 |
| 4,268,287 | A * | 5/1981 | Norris | 55/306 |
| 4,272,258 | A | 6/1981 | Shifflett | |
| 4,344,737 | A * | 8/1982 | Liu | 415/199.1 |
| 4,346,860 | A * | 8/1982 | Tedstone | 244/53 B |
| 4,387,514 | A | 6/1983 | McCaskill, Jr. | |
| 4,411,311 | A * | 10/1983 | Touze | 165/170 |
| 4,498,981 | A * | 2/1985 | Frevert | 209/243 |
| 4,519,902 | A * | 5/1985 | Kinder | 209/234 |
| 4,572,782 | A * | 2/1986 | Smith et al. | 209/236 |
| 4,602,924 | A * | 7/1986 | Eschenburg | 55/345 |
| 4,634,535 | A | 1/1987 | Lott | |
| 4,668,498 | A * | 5/1987 | Davis | 423/579 |
| 4,738,774 | A * | 4/1988 | Patrick | 209/236 |
| 4,750,920 | A | 6/1988 | Manuel et al. | |
| 4,872,949 | A | 10/1989 | Wilwerding | |
| 4,968,188 | A * | 11/1990 | Lucassen | 406/70 |
| 4,972,672 | A * | 11/1990 | Sanderson et al. | 60/39.092 |
| 5,105,560 | A * | 4/1992 | Ruiz-Avila et al. | 34/60 |
| 5,188,041 | A | 2/1993 | Noland et al. | |
| 5,281,275 | A * | 1/1994 | Milner | 127/2 |
| 5,302,023 | A * | 4/1994 | Larsen et al. | 374/46 |
| 5,340,276 | A * | 8/1994 | Norris et al. | 415/208.1 |
| 5,431,287 | A * | 7/1995 | Knox | 209/250 |
| 5,570,749 | A | 11/1996 | Reed | |
| 6,110,367 | A | 8/2000 | Jensen et al. | |
| 6,161,310 | A * | 12/2000 | Tuggle et al. | 34/480 |
| 6,200,428 | B1 | 3/2001 | VanKouwenberg | |
| 6,485,640 | B2 * | 11/2002 | Fout et al. | 210/188 |
| 6,652,332 | B1 * | 11/2003 | Westhoff | 440/41 |
| 6,662,892 | B2 * | 12/2003 | Falk et al. | 180/68.1 |
| 6,746,602 | B2 * | 6/2004 | Fout et al. | 210/188 |
| 6,838,008 | B2 * | 1/2005 | Fout et al. | 210/780 |
| 2002/0153332 | A1 * | 10/2002 | Fout et al. | 210/780 |
| 2002/0157811 | A1 * | 10/2002 | Vincent | 165/59 |
| 2003/0019820 | A1 * | 1/2003 | Fout et al. | 210/780 |
| 2003/0024398 | A1 * | 2/2003 | Fout et al. | 96/241 |
| 2003/0141324 | A1 * | 7/2003 | Kapaj et al. | 222/598 |
| 2004/0058596 | A1 * | 3/2004 | Westhoff | 440/41 |
| 2004/0074814 | A1 * | 4/2004 | Baglione et al. | 209/133 |
| 2004/0200664 | A1 * | 10/2004 | Monson et al. | 181/224 |
| 2004/0251182 | A1 * | 12/2004 | Fout et al. | 209/660 |
| 2005/0087501 | A1 * | 4/2005 | Fout et al. | 210/780 |

OTHER PUBLICATIONS

U.S. Office Action issued in corresponding U.S. Appl. No. 10/247,089; dated Feb. 5, 2004, 6 pages.

U.S. Office Action issued in corresponding U.S. Appl. No. 10/247,419; dated Dec. 23, 2002; 5 pages.

U.S. Office Action issued in corresponding U.S. Appl. No. 10/856,507; dated Oct. 6, 2005; 5 pages.

U.S. Office Action issued on corresponding U.S. Appl. No. 10/247,419; dated May 16, 2003; 3 pages.

U.S. Office Action issued on corresponding U.S. Appl. No. 10/247,419; dated Aug. 25, 2003; 5 pages.

U.S. Office Action issued on corresponding U.S. Appl. No. 10/856,507; dated Jan. 26, 2006; 9 pages.

* cited by examiner

FLOW DIVERTER AND EXHAUST BLOWER FOR VIBRATING SCREEN SEPARATOR ASSEMBLY

CROSS REFERENCE TO RELATED APPLICATIONS

The present application is a continuation of U.S. application Ser. No. 10/247,089, filed Sep. 19, 2002 now U.S. Pat. No. 6,838,008, Publication No. US-2003-0024398-A1, which is a division of U.S. application Ser. No. 09/836,974, filed on Apr. 18, 2001, U.S. Pat. No. 6,485,640, the disclosures of which are incorporated herein by reference.

BACKGROUND

This invention relates generally to screen separators, and in particular to flow diverters and exhaust blowers for screen separators.

A typical screen separator consists of an elongated, box-like, rigid bed, and a screen attached to, and extending across, the bed. The bed is vibrated as the material to be separated is introduced onto the screen which moves the relatively large size material down the screen and passes the liquid and/or relatively small sized material into a pan. The bed can be vibrated by pneumatic, hydraulic, or rotary vibrators, in a conventional manner.

Typically the material to be separated is conveyed onto the screen by directing the material from a flow line into the bottom of an open tank, commonly called a possum belly. The material fills the possum belly until it flows over a weir onto the screen. The weir is typically positioned such that the material falls on the beginning section of the screen. The possum belly acts as a fluid trap in which solids can collect at the bottom. The collection of solids in the bottom of the possum belly can cause the flow line to plug. A plugged flow line can stop drilling activity thereby costing the operator and the drilling contractor significant sums of money. Furthermore, free gases released from the material may collect in the vicinity of the possum belly that are combustible and/or are toxic to humans.

The present invention is directed to overcoming one or more of the limitations of existing screen separators.

SUMMARY

According to an exemplary embodiment of the present invention, an assembly for conveying materials including solids and liquids from a flow line to a screen separator assembly for separating the solids from the liquids is provided that includes a flow diverter having a conduit for receiving the materials from the flow line, decelerating the materials, and increasing the exposed surface area of the materials, and an exhaust blower for removing volatile vapors from the materials, a back wall coupled to the conduit for receiving the materials from the flow diverter, decelerating the materials, and reversing the direction of flow of the materials, and a half pipe positioned proximate the back wall comprising a flattened portion for receiving the materials from the half pipe, decelerating the materials, and reversing the direction of flow of the materials, and conveying the materials to the screen separator assembly.

The present embodiments of the invention provide a number of advantages. For example, the flow diverter assembly decelerates the flow of the materials thereby placing the materials onto the front most portion of the screen thereby enhancing the operational effectiveness of the screen during the separation of liquids and solid particles. Furthermore, the exhaust blower removes vapors from the materials that may be volatile and/or toxic thereby preventing explosions and/or harm to the human operators.

DESCRIPTION OF THE PREFERRED EMBODIMENTS

Figure 1:
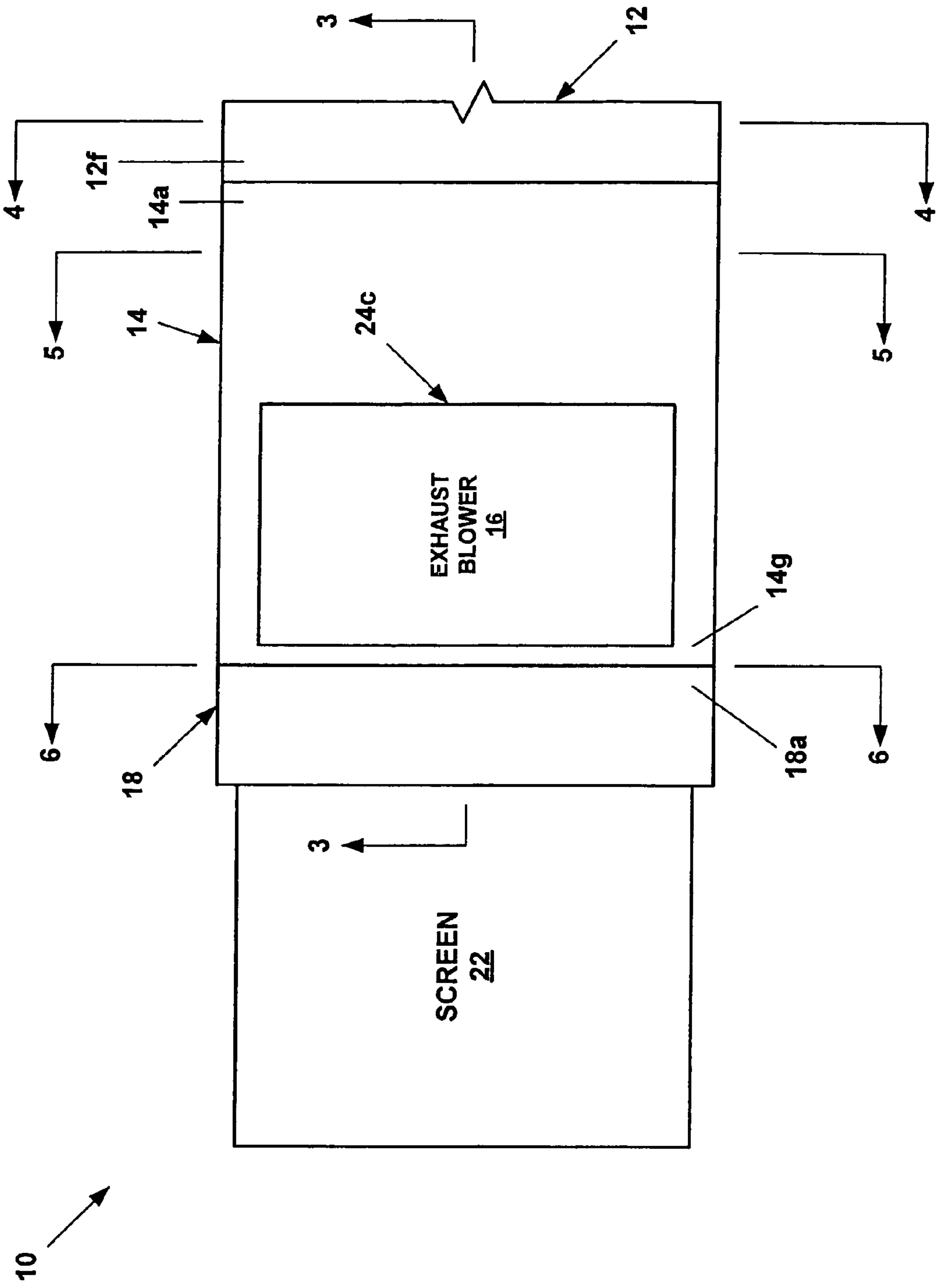
FIG. 1 is a top and schematic view of an embodiment of a vibrating screen assembly.
Figure 2:
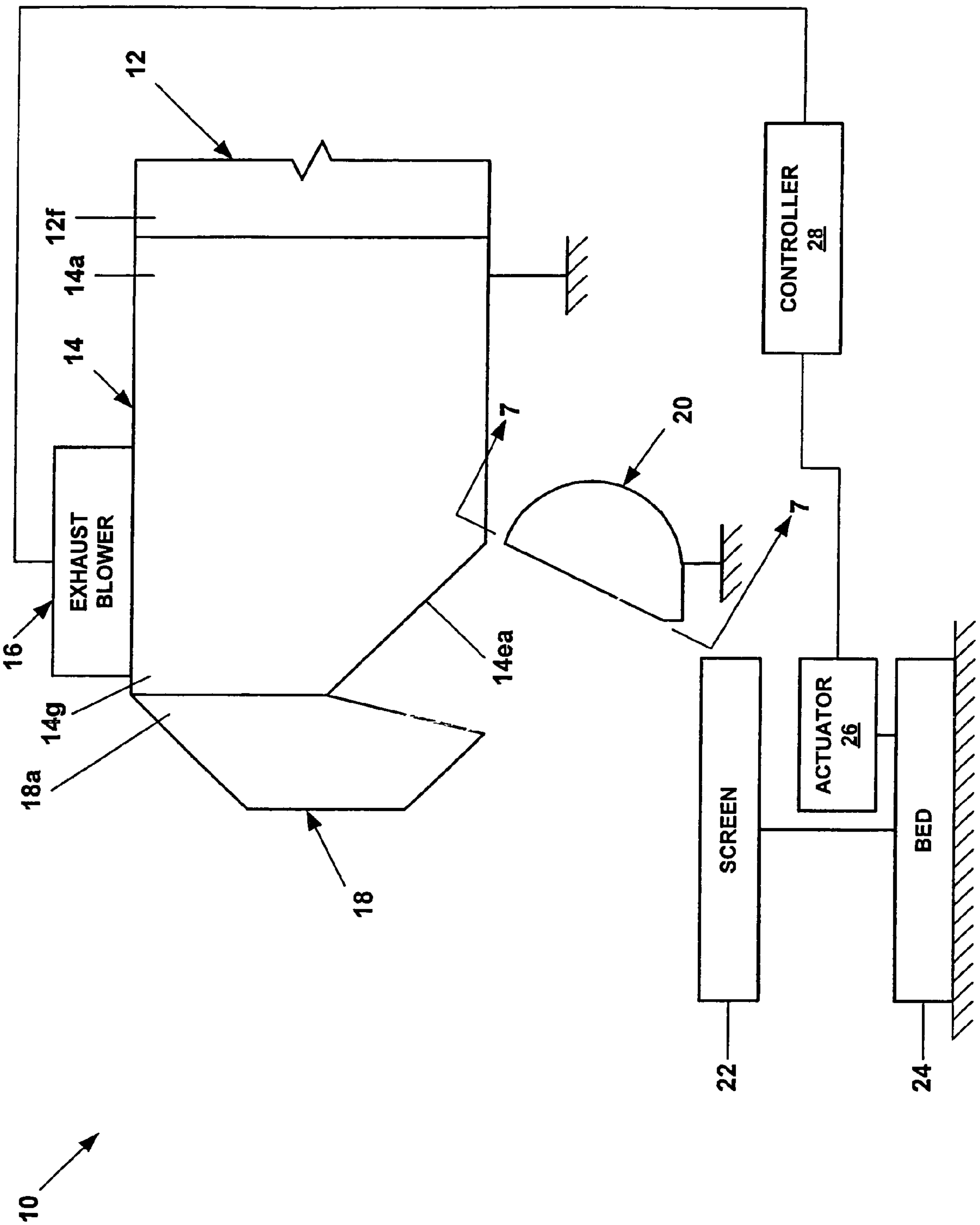
FIG. 2 is a side and schematic view of the vibrating screen assembly of FIG. 1.

Referring to FIGS. 1-7, the reference numeral 10 refers, in general, to a vibrating screen separator assembly that includes a flow line 12 defining a passage 12*a* that includes side walls 12*b*, 12*c*, 12*d*, and 12*e*. An end 12*f* of the flow line 12 is coupled to an end 14*a* of a conduit 14 defining a passage 14*b* that includes side walls 14*c*, 14*d*, 14*e*, and 14*f*. The side wall 14*c* of the conduit 14 includes an opening 14*ca* for receiving the inlet of an exhaust blower 16 and the side wall 14*e* of the conduit includes a ramp 14*ea* that extends upwardly from the side wall toward the side wall 14*c* in the direction of another end 14*g* of the conduit. In an exemplary embodiment, the ramp 14*ea* is positioned approximately beneath the opening 14*ca* in the side wall 14*c*, and the angle of attack of the ramp ranges from about 35 to 55 degrees for reasons to be described.

An end 18*a* of an end wall 18 defining a passage 18*b* is coupled to the end 14*g* of the conduit that includes an upper inclined wall 18*c*, a vertical wall 18*d*, a lower inclined wall 18*e*, and side walls, 18*f* and 18*g*. A half pipe assembly 20 defining a passage 20*a* is positioned proximate, and in opposing relation to, the passage 18*b* of the end wall 18. The half pipe assembly 20 includes a half pipe 20*b* having a flattened portion 20*ba*, and opposing side walls 20*c* and 20*d*.

A conventional screen 22 for separating liquids from solids is positioned proximate the half pipe assembly 20 for receiving materials containing liquids and solids from the half pipe assembly. In an exemplary embodiment, the screen 22 may be a conventional screen for separating solid particles and liquids commercially available from M-I LLC in Houston, Tex. The screen 22 is coupled to and supported by a conventional bed 24, and an actuator 26 is coupled to the bed 24 for moving the bed and screen 22 along a predetermined path of motion. A controller 28 is coupled to the blower 16 and the actuator 26 for controlling the operation of the blower and the actuator. In an exemplary embodiment, the controller 28 may be a general purpose programmable controller. In an exemplary embodiment, the actuator 26 is capable of imparting reciprocating linear or elliptical motion to the screen 22 and the bed 24 and is provided substantially as described in U.S. patent application Ser. No. 09/837,098, filed on Apr. 18, 2001, the disclosure of which is incorporated herein by reference.

During operation of the assembly 10, the controller 28 controls the operation of the actuator 23 to impart a predetermined path of motion to the screen 22 and the bed 24. In an exemplary embodiment, the operation of the actuator 26 and controller 28 is provided substantially as described in U.S. patent application Ser. No. 09/837,098, filed on Apr. 18, 2001, the disclosure of which is incorporated herein.

Figure 3:
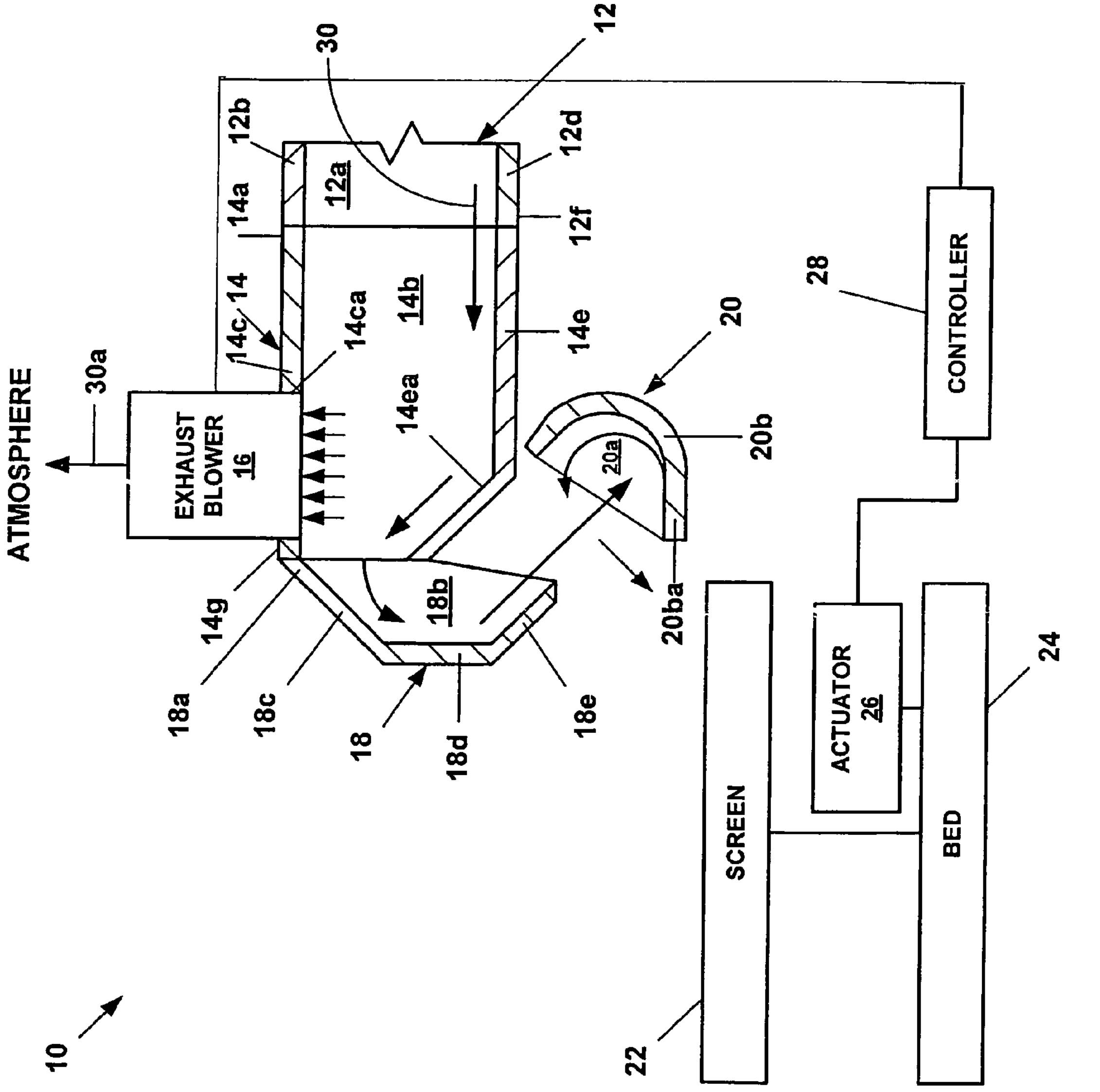
FIG. 3 is a fragmentary cross sectional and schematic view of the vibrating screen assembly of FIG. 1.
Figure 4:
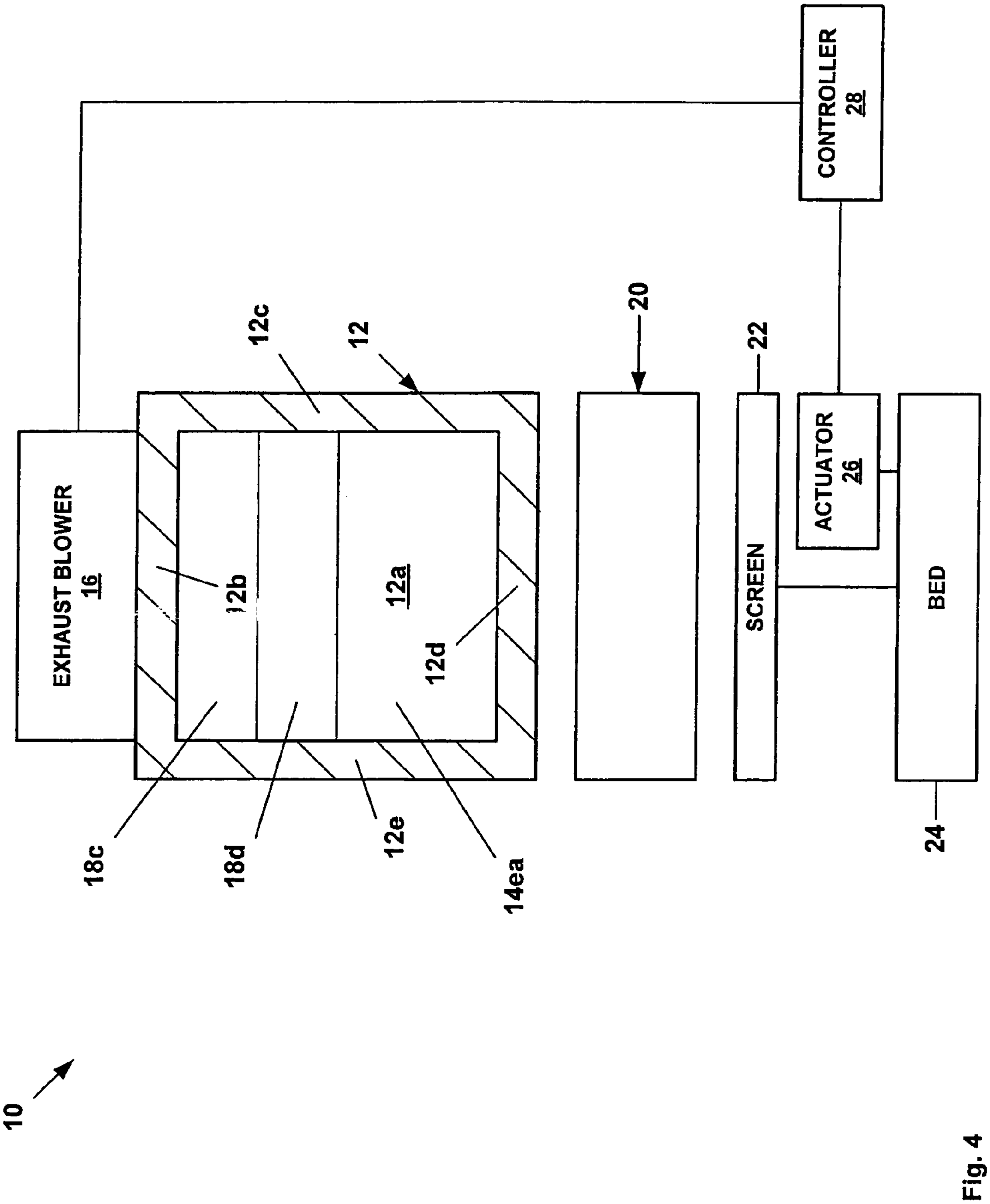
FIG. 4 is a fragmentary cross sectional and schematic view of the vibrating screen assembly of FIG. 1.
Figure 5:
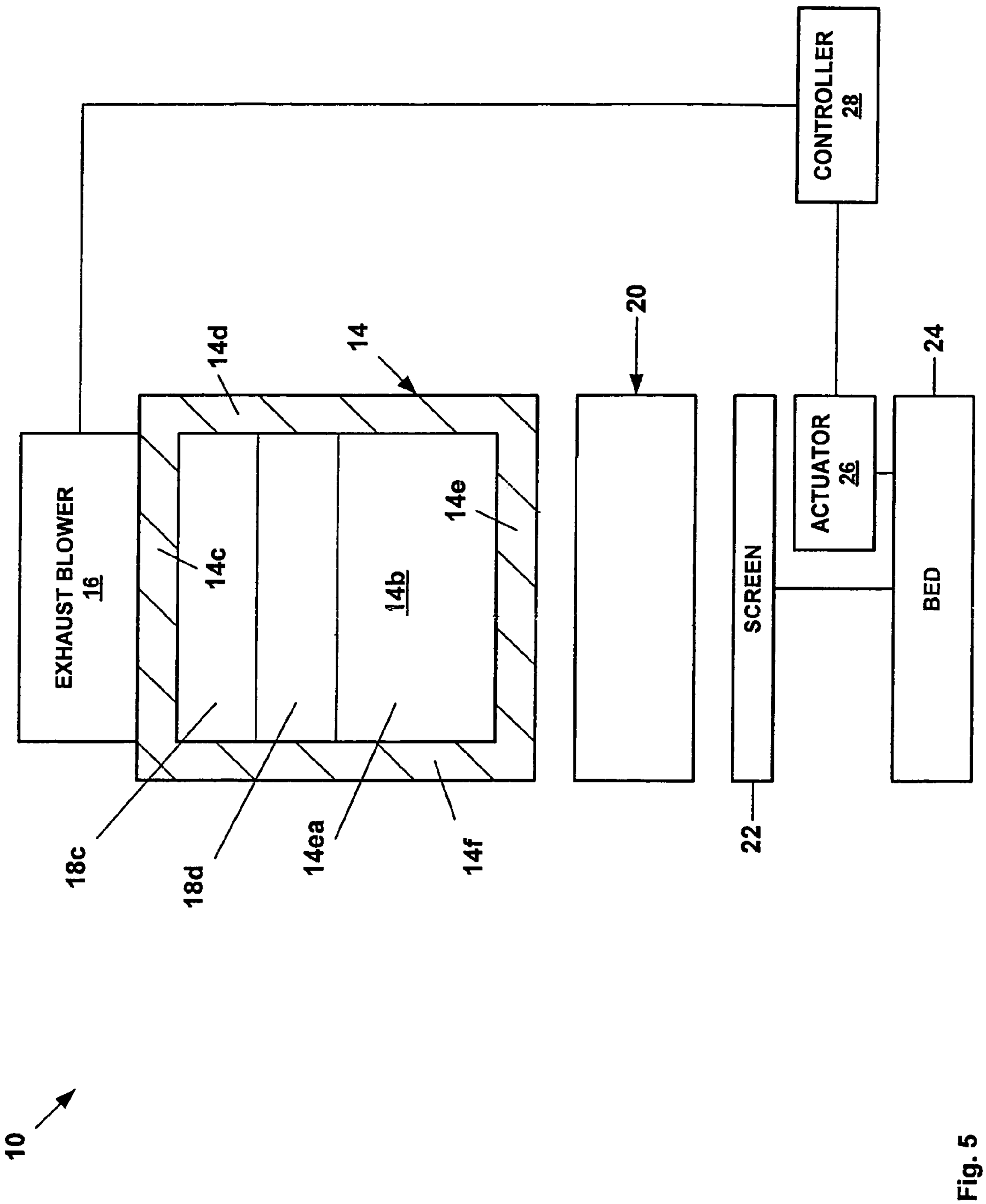
FIG. 5 is a fragmentary cross sectional and schematic view of the vibrating screen assembly of FIG. 1.
Figure 7:
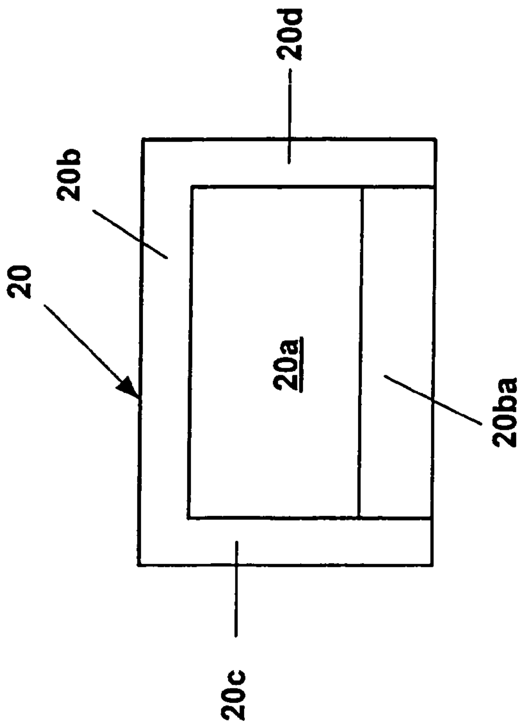
FIG. 7 is a front view of the half pipe of the vibrating screen assembly of FIG. 2.
Figure 6:
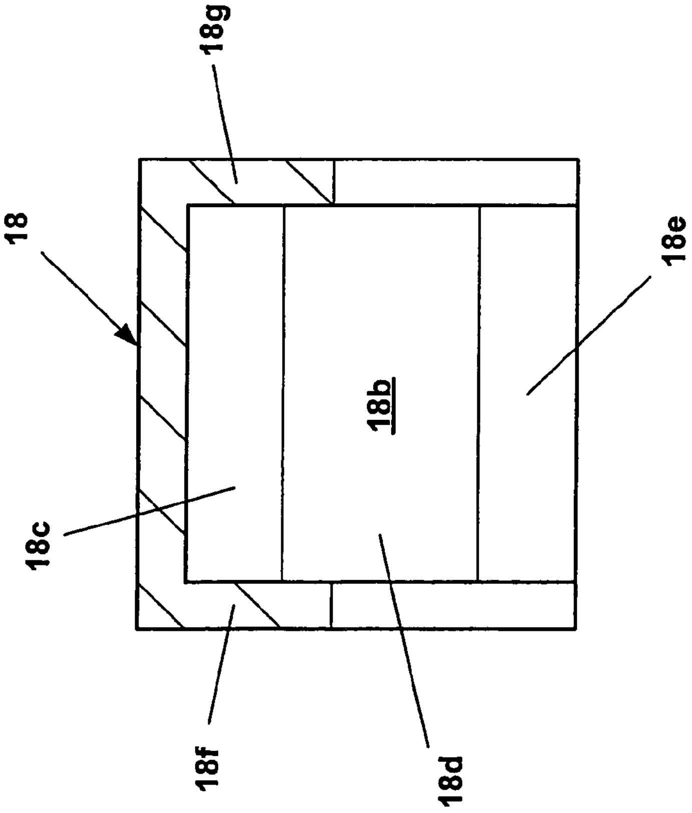
FIG. 6 is a fragmentary cross sectional view of the back wall of the vibrating screen assembly of FIG. 1.

Also, during operation of the assembly, as illustrated in FIG. 3, materials 30 are introduced into the end of the passage 12*a* of the flow line 12 in a conventional manner. The materials then pass from the passage 12*a* of the flow line 12 into the passage 14*b* of the conduit 14. Within the passage 14*b* of the conduit 14, the materials 30 are conveyed onto and up the ramp 14*ea* thereby decelerating the materials and increasing the exposed surface area of the materials. As the materials 30 pass up the ramp, the exhaust blower 16 removes volatile vapors 30*a* from the materials and exhausts the volatile vapors into the atmosphere. In this manner, potentially explosive and toxic vapors are removed from the materials 30 thereby preventing a dangerous explosion and protecting human operators from exposure to the volatile vapors. In several exemplary embodiments, the angle of attack of the ramp 14*ea* relative to the side wall 14*e* of the conduit 14 ranges from about 35 to 55 degrees in order to maximize the exposed surface area of the materials 30 thereby enhancing the removal of volatile vapors from the materials 30 by the exhaust blower 16.

The materials 30 then pass over the top edge of the ramp 14*ea* into the passage 18*b* of the end wall 18. Within the passage 18*b* of the end wall 18, the materials 30 impact the upper inclined wall 18*c*, the vertical well 18*d*, and the lower inclined wall 18*e* and thereby are decelerated and the direction of flow of the materials is substantially reversed. The materials then fall out of the passage 18*b* of the end wall 18 downwardly in the form of a curtain of materials into the passage 20*a* of the half pipe assembly 20. In an exemplary embodiment, the curtain of the material 30 impacts the interior of the half pipe assembly 20 along the flattened portion 20*ba* of the half pipe 20*b*. Within the passage 20*a* of the half pipe assembly 20, the materials 30 then flow in a counter-clockwise circular vortex path along the inner curved surface of the half pipe 20*b* and then fall onto the front portion of the screen 22. Thus, the half pipe assembly 20 decelerates the materials 30 and also reverses the direction of flow of the materials. As a result, the velocity of the materials 30 is reduced such that the materials 30 may be deposited onto the portion of the screen 22 immediately adjacent to the half pipe assembly 20. As result, the separation of liquids from solids during the movement of the screen 22 and bed 24 by the actuator 26 is improved.

Thus, the conduit 14, the back wall 18, and the half pipe assembly 20, singularly, and in combination, provide a flow diverter assembly that decelerates the material 30 as the material passes through the assembly 10. In particular, the ramp 14*ea*, the back wall 18, and the half pipe assembly 20 each act to decelerate the materials 30 as they pass through the assembly 10. Furthermore, the ramp 14*ea*, the back wall 18 and the half pipe assembly 20 change the direction of flow of the materials 30, and the back wall and half pipe assembly reverse the direction of the flow of the materials. In this manner, the materials 30 are decelerated and may thereby be placed onto the front most portion of the screen 22 immediately adjacent to the half pipe assembly 20 thereby enhancing the operational effectiveness of the screen. Finally, the ramp 14*ea* also, by forcing the material 30 to pass up the ramp, increases the exposed surface area of the material thereby increasing the volume of vapors that may be removed by the exhaust blower 16.

The present embodiments of the invention provide a number of advantages. For example, the assembly 10 decelerates the flow of the materials 30 thereby placing the materials onto the front most portion of the screen 22 thereby enhancing the operational effectiveness of the screen during the separation of solid particles and liquids. Furthermore, the exhaust blower 16 removes vapors from the materials that may be volatile and/or toxic thereby preventing explosions and/or harm to the human operators.

It is understood that variations may be made in the foregoing without departing from the scope of the invention. For example, a vacuum pump, or equivalent device, may be substituted for or used in addition to the exhaust blower. Furthermore, the screen 22, bed 24, actuator 26, and controller 28 may be any number of commercially available conventional devices. In addition, the geometry of the passages 12*a*, 14*b*, 18*b*, and 20*a* may be, for example, circular, oval, elliptical, parallelepiped, or square. Finally, the exhaust blower 16 may be coupled to a controllable power source via an on/off switch instead of, or in combination with, being operably coupled to the controller 28.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A flow diverter assembly for enhancing the operational effectiveness of a screen separator for separating solids from liquids in a supply of material from a flow line, comprising:

a conduit coupled to the flow line for receiving material from the flow line, wherein the conduit further comprises a ramp for a first deceleration of the flow of the material and a first directional change of flow of the material;

an end wall coupled to the conduit, wherein the end wall causes a second deceleration of the flow of material and a second directional change of flow of the material;

a half pipe assembly proximate to and spaced apart from the end wall, wherein the half pipe assembly comprises an inner curved surface for a third deceleration of the flow of material and a third directional change of the flow of the material; and a material discharge area between the end wall and the half pipe assembly, wherein the flow of the material passes through the material discharge area and is discharged to the screen for separating solids from liquids, wherein the conduit defines a sidewall such that the ramp extends upwardly from the sidewall of the conduit at an angle of about 35° to 55° relative to the sidewall of the conduit, and wherein the material flows through the half pipe assembly in a circular vortex path along the inner curved surface of the half pipe assembly, thereby substantially reversing the flow of the material relative to the flow of the material entering the half pine assembly prior to discharging the material to the screen through the material discharge area.

2. The flow diverter assembly of claim 1, wherein the ramp increases the exposed surface area of the material.

3. The flow diverter assembly of claim 1, wherein the end wall substantially reverses the direction of flow of the material.

4. The flow diverter assembly of claim 1, wherein the material flows through the half pipe assembly in a counter-clockwise direction.

5. The flow diverter assembly of claim 1, wherein the velocity of the third decelerated material is reduced such that the material is deposited onto the portion of the screen immediately adjacent to the half pipe assembly.

6. A flow diverter assembly for enhancing the operational effectiveness of a screen separator for separating solids from liquids in a supply of material from a flow line, comprising:

a conduit coupled to the flow line for receiving material from the flow line, wherein the conduit further comprises a ramp for a first deceleration of the flow of the material and a first directional change of flow of the material;

an end wall coupled to the conduit, wherein the end wall causes a second deceleration of the flow of material and a second directional change of flow of the material;

a half pipe assembly proximate to and spaced apart from the end wall, wherein the half pipe assembly comprises an inner curved surface for a third deceleration of the flow of material and a third directional change of the flow of the material; and a material discharge area between the end wall and the half pipe assembly, wherein the flow of the material passes through the material discharge area and is discharged to the screen for separating solids from liquids, wherein the conduit further includes an opening for receiving an inlet of an exhaust blower and wherein the exhaust blower enables the removal of vapors from the material flowing along the ramp, and wherein the material flows through the half pipe assembly in a circular vortex path along the inner curved surface of the half pipe assembly, thereby substantially reversing the flow of the material relative to the flow of the material entering the half pipe assembly prior to discharging the material to the screen through the material discharge area.

7. A flow diverter assembly for enhancing the operational effectiveness of a screen separator for separating solids from liquids in a supply of material from a flow line, comprising:

a conduit coupled to the flow line for receiving material from the flow line, wherein the conduit further comprises a ramp for a first deceleration of the flow of the material and a first directional change of flow of the material;

an end wall coupled to the conduit, wherein the end wall causes a second deceleration of the flow of material and a second directional change of flow of the material;

a half pipe assembly proximate to and spaced apart from the end wall, wherein the half pine assembly comprises and an inner curved surface for a third deceleration of the flow of material and a third directional change of the flow of the material; and a material discharge area between the end wall and the half pine assembly, wherein the flow of the material passes through the material discharge area and is discharged to the screen for separating solids from liquids, wherein the material flows through the half pipe assembly in a circular vortex path along the inner curved surface of the half pipe assembly, thereby substantially reversing the flow of the material relative to the flow of the material entering the half pipe assembly prior to discharging the material to the screen through the material discharge area.

* * * * *

UNITED STATES PATENT AND TRADEMARK OFFICE

CERTIFICATE OF CORRECTION

PATENT NO. : 7,380,673 B2
APPLICATION NO. : 10/992321
DATED : June 3, 2008
INVENTOR(S) : Gary E. Fout et al.

It is certified that error appears in the above-identified patent and that said Letters Patent is hereby corrected as shown below:

In Claim 1, column 4, line 62, the word "pine" should be --pipe--.

In Claim 7, column 6, line 18, the word "pine" should be --pipe--.

In Claim 7, column 6, line 19, the word "and" should be deleted.

In Claim 7, column 6, line 23, the word "pine" should be --pipe--.

Signed and Sealed this

Twelfth Day of August, 2008

JON W. DUDAS
*Director of the United States Patent and Trademark Office*